United States Patent
Naidu et al.

(10) Patent No.: US 12,433,905 B2
(45) Date of Patent: Oct. 7, 2025

(54) STABLE ORAL COMPOSITION OF CYCLOPHOSPHAMIDE

(71) Applicant: INTAS PHARMACEUTICALS LTD., Gujarat Ahmedabad (IN)

(72) Inventors: Venkataramana Naidu, Ahmedabad (IN); Jwalant Vijaybhai Desai, Ahmedabad (IN); Mayank Saxena, Ahmedabad (IN); Ashutosh Jamloki, Ahmedabad (IN)

(73) Assignee: INTAS PHARMACEUTICALS LTD., Gujarat (IN)

( * ) Notice: Subject to any disclaimer, the term of this patent is extended or adjusted under 35 U.S.C. 154(b) by 943 days.

(21) Appl. No.: 17/625,649

(22) PCT Filed: Jul. 9, 2020

(86) PCT No.: PCT/IB2020/056450
§ 371 (c)(1),
(2) Date: Jan. 7, 2022

(87) PCT Pub. No.: WO2021/005544
PCT Pub. Date: Jan. 14, 2021

(65) Prior Publication Data
US 2022/0265688 A1   Aug. 25, 2022

(30) Foreign Application Priority Data
Jul. 10, 2019 (IN) .............. 201921027551

(51) Int. Cl.
*A61K 31/675* (2006.01)
*A61K 9/00* (2006.01)
*A61K 47/26* (2006.01)

(52) U.S. Cl.
CPC .......... *A61K 31/675* (2013.01); *A61K 9/0095* (2013.01); *A61K 47/26* (2013.01)

(58) Field of Classification Search
CPC ..... A61K 31/675; A61K 9/0095; A61K 47/26
See application file for complete search history.

(56) References Cited

U.S. PATENT DOCUMENTS

| | | |
|---|---|---|
| 4,537,883 A | 8/1985 | Alexander et al. |
| 5,036,060 A | 7/1991 | Alam et al. |
| 5,227,374 A | 7/1993 | Alexander et al. |
| 5,418,223 A | 5/1995 | Palepu et al. |
| 10,149,857 B2 | 12/2018 | Smith et al. |

FOREIGN PATENT DOCUMENTS

| | | |
|---|---|---|
| EP | 0271622 B1 | 6/1991 |
| EP | 2745833 A1 | 6/2014 |
| EP | 3139929 A2 | 3/2017 |
| WO | 14068585 A1 | 5/2014 |

OTHER PUBLICATIONS

Healthcare Packaging. Bormioli Pharma: Dual-Chamber Packaging System. Apr. 25, 2018 https://www.healthcarepackaging.com/industries/pharmaceuticals/press-release/13294708/bormioli-pharma-dualchamber-packaging-system (Year: 2018).*
Kovalcik et al. Journal of Parenteral Science Technology. 1988;. 42(1):29-38 (Year: 1988).*
Patel et al. European Journal of Pharmaceutical Sciences. 2017;101:251-257 (Year: 2017).*
International Search Report for PCT/IB2020/056450, Prepared by the European Patent Office, Mailing date Dec. 4, 2020, 3 pages.

* cited by examiner

*Primary Examiner* — Clinton A Brooks
*Assistant Examiner* — Jerica Katlynn Wilson
(74) *Attorney, Agent, or Firm* — Brooks Kushman P.C.

(57) ABSTRACT

A stable oral composition for cyclophosphamide or its pharmaceutically acceptable salt. The composition for cyclophosphamide can be in the form of powder for oral solution, which can provide an improved stability, ease for reconstitution, and better palatability suitable for pediatric patients. Also disclosed is a process for preparation of the powder for oral solution of cyclophosphamide.

13 Claims, No Drawings

STABLE ORAL COMPOSITION OF CYCLOPHOSPHAMIDE

CROSS-REFERENCE TO RELATED APPLICATION

This application is the U.S. national phase of PCT Application No. PCT/IB2020/056450 filed on Jul. 9, 2020, which is related to Indian Provisional Application No. IN201921027551 filed on Jul. 10, 2019 the disclosures of which are incorporated in their entirety by reference herein.

FIELD OF THE INVENTION

This invention relates to a stable oral composition for cyclophosphamide. The said composition for cyclophosphamide can be in the form of powder for oral solution, which can provide an improved stability, ease for reconstitution, and better palatability suitable for pediatric patients. Further, the invention relates to a process for preparation of the said powder for oral solution of cyclophosphamide. Moreover, the invention relates to a kit comprising said stable oral composition for cyclophosphamide.

BACKGROUND OF THE INVENTION

Cyclophosphamide, chemically known as (RS)—N, N-bis (2-chloroethyl)-1, 3, 2-oxazaphosphinan-2-amine 2-oxide, is a synthetic antineoplastic drug, and it is used in the treatment of malignant diseases and nephrotic syndrome. The malignant diseases include lymphomas, multiple myeloma, leukemia's, mycosis fungoides, neuroblastoma, adenocarcinoma of the ovary, retinoblastoma and breast carcinoma.

Currently, there are three dosage forms of cyclophosphamide available on the market, which includes tablet, capsule and lyophilized powder for injection solution, namely CYTOXAN®. The previously available lyophilized powder comprised of Cyclophosphamide monohydrate and mannitol, however the product is discontinued now. Further, cyclophosphamide monohydrate is commercially available neat i.e. without any bulking agent. However, this product is difficult to dissolve and hence difficult to reconstitute.

The U.S. Pat. No. 4,537,883 discloses lyophilized pharmaceutical solid composition containing cyclophosphamide for reconstitution with water to provide a solution for oral or parenteral administration.

The EP patent application No. EP2745833 A1 discloses dispersible or orodispersible tablet of cyclophosphamide which can be administered orally after dispersing it in an aqueous solution or beverage, such as water.

The EP patent application No. EP3139929 A4 discloses ready to dilute or ready to use cyclophosphamide containing composition comprising ethanol and acidifying agent such as citric acid.

The EP patent No. EP0271622 B1 discloses lyophilized composition of cyclophosphamide with Galactitol.

The U.S. Pat. No. 5,036,060 discloses Mannitol-free lyophilized composition of cyclophosphamide with sodium chloride.

The U.S. Pat. No. 5,418,223 discloses a process for preparation of lyophilized composition of cyclophosphamide.

The PCT Application No. WO2014068585 discloses a composition comprising lyophilized cyclophosphamide monohydrate and its process for preparation.

The currently marketed formulations are suitable for adults, but they are not adopted for pediatric patients. Indeed, the children find difficulty for swallowing tablets, and the intravenous administration is quite traumatic. This situation is particularly critical for newborn babies as well as young children. In addition, chemotherapy intravenous administration is not appropriate for ambulatory treatments, whereas the children have to take a daily dose over months.

Therefore, cyclophosphamide is generally administered to children using the powder for I.V. formulations. However, the dissolution of cyclophosphamide powder in water is slow, and the solution becomes a cloudy suspension rather than a real solution. Therefore, it is difficult to ensure that the proper amount has been administered orally to the paediatric patients. Moreover, the lyophilization method requires sophisticated equipment and skilled artisan, therefore the cost of the lyophilized powder and the product stability are other limiting factors for making a suitable powder for Oral solution dosage form suitable for the paediatric patients.

Furthermore, once Cyclophosphamide is dissolved in solution, it should be immediately administered (i.e. within 48 hours) since cyclophosphamide is not stable on a long term in aqueous solution. Therefore, oral administration of cyclophosphamide using dissolved powder is always performed under strict control at the hospital; which requires that the child should come to the hospital for frequent dosing over months.

Thus, there is an urgent need to provide a new dosage form of cyclophosphamide, which could facilitate the effective administration, in particular for the children. The inventors of the present invention have developed a stable powder for oral solution comprising a blend of Cyclophosphamide and mannitol, which can be reconstituted with a diluent (e.g. water) within a kit (e.g. dual-chamber bottle) prior to administration. Further, the stable powder for oral solution comprises Cyclophosphamide, mannitol and optionally sweetener, flavouring agent and/or preservative, wherein the said powder for oral solution is prepared without lyophilization. Therefore, the said powder for oral solution provides ease for reconstitution, improved stability and good palatability that is suitable for treatment of malignant diseases and nephrotic syndrome in the pediatric patients.

OBJECTS OF THE INVENTION

The primary object of the present invention is to provide a stable oral composition comprising cyclophosphamide and one or more pharmaceutically acceptable excipients, wherein the said composition is in the form of a powder for oral solution.

Another object of the present invention is to provide a stable powder for oral solution comprising a blend of cyclophosphamide and one or more pharmaceutically acceptable excipients, wherein the said powder is not obtained by lyophilization.

Another object of the present invention is to provide a stable powder for oral solution comprising a blend of cyclophosphamide and mannitol, wherein the ratio of mannitol:cyclophosphamide is not more than about 1.2:1, and optionally consisting of sweetener, flavouring agent and/or preservative, wherein the said powder is not obtained by lyophilization.

Another object of the present invention is to provide an oral composition comprising: (a) a powder blend of cyclophosphamide and mannitol, (b) a diluent, wherein the said powder can be reconstituted with diluent prior to administration.

Another object of the present invention is to provide an oral composition comprising: (a) a powder blend of cyclophosphamide and mannitol, (b) a diluent and optionally consisting of sweetener and flavouring agent, wherein the powder can be reconstituted with diluent prior to administration.

Another object of the present invention is to provide an oral composition comprising: (a) a powder blend of cyclophosphamide and mannitol, (b) a diluent and optionally consisting of sweetener, flavouring agent and/or preservative, wherein the powder can be reconstituted with diluent prior to administration.

Another object of the present invention is to provide an oral composition comprising: (a) a powder blend of cyclophosphamide, mannitol and optionally consisting of sweetener and flavouring agent, and (b) a diluent, wherein the powder can be reconstituted with diluent prior to administration.

Another object of the present invention is to provide an oral composition comprising: (a) a powder blend of cyclophosphamide, mannitol and optionally consisting of sweetener, flavouring agent and/or preservative, and (b) a diluent, wherein the powder can be reconstituted with diluent prior to administration.

Another object of the present invention is to provide a kit comprising: (a) the powder for oral solution comprising a powder blend of cyclophosphamide and mannitol, and (b) a diluent, wherein the said powder can be reconstituted with the diluent in the said kit prior to administration.

Another object of the present invention is to provide a kit comprising: (a) the powder for oral solution comprising a powder blend of cyclophosphamide, mannitol, and optionally consisting of sweetener, flavoring agent and/or preservative, (b) a diluent, wherein the said powder can be reconstituted with the diluent in the said kit prior to administration.

Another object of the present invention is to provide a kit comprising: (a) the powder for oral solution comprising a powder blend of cyclophosphamide and mannitol, (b) a diluent, optionally comprising sweetener, flavoring agent and/or preservative, wherein the said powder can be reconstituted with the diluent in the said kit prior to administration.

Another object of the present invention is to provide a process for the preparation of stable powder for oral solution comprising cyclophosphamide and one or more pharmaceutically acceptable excipients.

Another object of the present invention is to provide a process for preparation of stable powder for oral solution comprising the steps of:
i) Blending of Cyclophosphamide, mannitol, and optionally sweetener, flavoring agent and/or preservative for proper mixing.
ii) Filling the required quantity of powder blend in a packaging container.

Another object of the present invention relates to a process for preparation of a kit comprising a stable powder for oral solution and a diluent comprising the steps of:
i) Blending of Cyclophosphamide, mannitol, and optionally sweetener, flavoring agent and/or preservative for proper mixing.
ii) Filling the required quantity of powder blend and water as a diluent in a kit.

Another object of the present invention is to provide a method for treatment of malignant diseases in a paediatric patient comprising of administering an oral composition from a kit comprising: (a) the powder for oral solution comprising a blend of cyclophosphamide and mannitol, (b) diluent, wherein the said powder can be reconstituted with the diluent in the said kit prior to administration.

SUMMARY OF THE INVENTION

In a first embodiment, the present invention is to provide a stable oral composition comprising cyclophosphamide and one or more pharmaceutically acceptable excipients, wherein the said composition is in the form of a powder for oral solution.

In another embodiment, the present invention relates to a stable powder for oral solution comprising a blend of cyclophosphamide and one or more pharmaceutically acceptable excipients, wherein the said powder is not obtained by lyophilization.

In another embodiment, the present invention relates to a stable powder for oral solution comprising a blend of cyclophosphamide and mannitol, wherein the ratio of mannitol:cyclophosphamide is not more than about 1.2:1, and optionally consisting of sweetener and flavouring agent, wherein the said powder is not obtained by lyophilization.

In another embodiment, the present invention relates to an oral composition comprising: (a) a powder blend of cyclophosphamide and mannitol, (b) a diluent, wherein the said powder can be reconstituted with diluent prior to administration.

In another embodiment, the present invention relates to an oral composition comprising: (a) a powder blend of cyclophosphamide and mannitol, (b) a diluent, and optionally consisting of sweetener, flavoring agent and/or preservative, wherein the powder can be reconstituted with diluent prior to administration.

In another embodiment, the present invention relates to an oral composition comprising: (a) a powder blend of cyclophosphamide, mannitol, and optionally consisting of sweetener, flavoring agent and/or preservative, and (b) a diluent, wherein the powder can be reconstituted with diluent prior to administration.

In another embodiment, the present invention relates to a kit comprising: (a) the powder for oral solution comprising a powder blend of cyclophosphamide and mannitol, and (b) a diluent, wherein the said powder can be reconstituted with the diluent in the said kit prior to administration.

In another embodiment, the present invention relates to a kit comprising: (a) the powder for oral solution comprising a powder blend of cyclophosphamide, mannitol, and optionally consisting of sweetener, flavoring agent and/or preservative, (b) diluent, wherein the said powder can be reconstituted with the diluent in the said kit prior to administration.

In another embodiment, the present invention relates to a kit comprising: (a) the powder for oral solution comprising a powder blend of cyclophosphamide and mannitol, (b) a diluent optionally comprising sweetener, flavoring agent and/or preservative, wherein the said powder can be reconstituted with the diluent in the said kit prior to administration.

In another embodiment, the present invention relates to a process for preparation of stable powder for oral solution comprising cyclophosphamide and one or more pharmaceutically acceptable excipients.

In another embodiment, the present invention relates to a process for preparation of stable powder for oral solution comprising the steps of:

i) Blending of Cyclophosphamide, mannitol, and optionally sweetener, flavoring agent and/or preservative for proper mixing.

ii) Filling the required quantity of powder blend in a packaging container.

In another embodiment, the present invention relates to a process for preparation of a kit comprising a stable powder for oral solution and a diluent comprising steps of:

i) Blending of Cyclophosphamide, mannitol, and optionally sweetener, flavoring agent and/or preservative for proper mixing.

ii) Filling the required quantity of powder blend and water as a diluent in a kit.

In another embodiment, the present invention relates to a method for treatment of malignant diseases in a paediatric patient comprising of administering an oral composition from a kit comprising: (a) the powder for oral solution comprising a blend of cyclophosphamide and mannitol, (b) diluent, wherein the said powder can be reconstituted with the diluent in the said kit prior to administration.

DETAILED DESCRIPTION

The detailed description and the examples provided herein are exemplary and any modification or variation within the scope of the invention will be apparent to a person skilled in the art. Further, unless otherwise defined, all the technical and scientific terms used herein shall bear the meaning as understood by a person who is ordinarily skilled in the art.

In one aspect, the present invention provides a stable oral composition comprising cyclophosphamide in the form of a powder for solution that can be reconstituted with a diluent (e.g. water) prior to the administration to a patient.

The term "Cyclophosphamide" used within the specification refers to the drug Cyclophosphamide and its pharmaceutically acceptable salt, pharmaceutically acceptable solvates, pharmaceutically acceptable hydrates, pharmaceutically acceptable enantiomers, pharmaceutically acceptable derivatives, pharmaceutically acceptable polymorphs and pharmaceutically acceptable pro-drugs thereof.

Not bound to any theory, the term "stable" as used throughout the specification, refers to the powder for oral solution of Cyclophosphamide, wherein the said powder contains not more than 5% W/W of total impurity of Cyclophosphamide. Preferably, the impurity is not more than 3.5%, and more preferably the impurity is not more than 2% of Cyclophosphamide. In another embodiment, the stable powder for oral solution refers to a pharmaceutical composition in which the active ingredient, Cyclophosphamide is present in an amount of at least 90% of the original label specified amount for each such ingredient during specific storage conditions (i.e. at least three months at 40° C./75% RH, 30° C./65% RH and 25° C./60% RH (i.e. relative humidity)). In a preferred embodiment, the oral pharmaceutical composition of the present invention is a powder for oral solution comprising a blend of Cyclophosphamide and mannitol, and wherein the said powder is not obtained by lyophilization. The said powder for oral solution does not result into formation of significant amount of impurities when stored at specific storage conditions.

The term "specific storage conditions" as used throughout the specification, refers to the pharmaceutical composition of present invention stored for at least three months at 40° C./75% RH, 30° C./65% RH and 25° C./60% RH. The term "impurities" of Cyclophosphamide as used throughout the specification, refers to identified or unidentified degradation product or impurity structurally related with cyclophosphamide which shall arise from manufacturing process or during storage.

The term "diluent" as used throughout the specification, refers to a suitable solvent in which cyclophosphamide can be dissolved. In a preferred embodiment, the diluent for the present invention is water.

The term "kit" as used throughout the specification, refers to the packaging container comprising two components. In one embodiment, a kit comprises a dual-component packaging comprising: (a) a powder blend of Cyclophosphamide and mannitol in the first component, (b) a diluent in the second component. In another embodiment, the kit can be a dual-chamber packaging comprising: (a) the powder blend of cyclophosphamide and mannitol, (b) a diluent, wherein the powder can be reconstituted with the diluent in the said kit prior to administration.

In a preferred embodiment, a kit comprises a dual-chamber bottle comprising: (a) the powder blend of cyclophosphamide and mannitol, (b) water, optionally comprising sweetener, flavoring agent and/or preservative, wherein the said powder can be reconstituted with water in the said kit prior to administration.

It is within the scope of the present invention to use the bottles of varying shapes, size and mechanisms of reconstituting the powder blend with the diluent. Further, other similar packaging containers can also be used such that it allows reconstitution of the powder blend with a diluent, and the oral solution can be administered to a patient. The present invention is not limited to a dual-chamber bottle, and the equivalent packaging containers are included within the scope of the invention.

In another embodiment, the amount of cyclophosphamide in the said stable powder for oral solution is in the range from 5 mg/ml to 50 mg/ml, more preferably from 10 mg/ml to 30 mg/ml.

Further, the stable oral composition of the present invention comprises one or more pharmaceutically acceptable excipients selected form the group consisting of lactose, microcrystalline cellulose, starch, pre-gelatinized starch, calcium phosphate, calcium sulfate, calcium carbonate, mannitol, sorbitol, xylitol, sucrose, maltose, fructose, dextrose, and maltodextrin or mixture thereof. In a preferred embodiment, the excipient is mannitol. Further, the amount of mannitol is selected such that the ratio of mannitol:cyclophosphamide is not more than about 1.2:1 in the said powder for oral solution.

Additionally, the oral pharmaceutical composition of the present invention may also comprise at least one sweetener, at least one flavouring agent and/or at least one or more preservative. These excipients can be added either in the powder blend or dissolved in the diluent.

The sweetener can be selected form the group consisting of alitame, acesulfame potassium, aspartame, D-tryptophan, dextrose, erythritol, fructose, galactose, glycerol, glycyrrhizin, glucose, isomalt, xylitol, xylose, lactitol, lactose, levulose, maltitol, maltodextrin, maltol, maltose, mannitol, corn syrup, neohesperidin dihydrochalcone, neotame, saccharin, siclamate, sorbitol, sucralose, sucrose, tagatose, taumatin, trehalose. Preferably the sweetener used in the stable oral composition of Cyclophosphamide is sucralose. Preferably the ratio of Cyclophosphamide to sweetener is in the range from 50:0.1 to 50:2, more preferably the ratio of Cyclophosphamide to sweetener is 50:1. The ratio of Cyclophosphamide to sweetener in the oral composition can be varied based on the type of sweetener.

The flavouring agent can be selected form the group consisting of essential oils including peppermint oil, orange oil, and lemon oil or can be selected from fruit flavors. Preferably the flavouring agent used in the stable oral composition of Cyclophosphamide is forest berry flavour. Preferably the ratio of Cyclophosphamide to flavouring agent is in the range from 50:0.01 to 50:1, more preferably the ratio of Cyclophosphamide to flavouring agent is 50:0.2. The ratio of Cyclophosphamide to flavouring agent in the oral composition can be varied based on the type of flavouring agent.

The preservatives can be selected from the group consisting of alcohol, benzalkonium chloride, benzethonium chloride, benzoic acid, benzyl alcohol, boric acid, bronopol, butylene glycol, butylparaben, calcium acetate, calcium chloride, calcium lactate, cetrimide, cetylpyridinium chloride, chlorhexidine, chlorobutanol, chlorocresol, chloroxylenol, citric acid monohydrate, cresol, glycerin, hexetidine, imidurea, monothioglycerol, phenol, phenoxyethanol, phenylethyl alcohol, phenylmercuric acetate, phenylmercuric borate, phenylmercuric nitrate, potassium benzoate, potassium metabisulfite, potassium sorbate, propionic acid, propylene glycol, methyl paraben, propyl paraben, sodium acetate, sodium benzoate, sodium borate, sodium lactate, sodium metabisulfite, sodium propionate, sodium sulfite, sorbic acid, sulfur dioxide, thimerosal. Preferably the preservatives used in stable oral composition of Cyclophosphamide are methyl paraben and propyl paraben. Preferably the ratio of Cyclophosphamide to preservative is in the range from 50:0.5 to 50:5, more preferably the ratio of Cyclophosphamide to flavouring agent is 50:2.33. The ratio of Cyclophosphamide to preservative in the oral composition can be varied based on the type of preservative.

In another embodiment, the compositions of the present invention can be used as single-dose or multi-dose administration to adults as well as paediatric patients.

The stable powder for oral solution is reconstituted with the diluent to obtain reconstituted solution. This solution can be administered as a single-dose for one-time use only or it can be administered as a multi-dose for multiple administrations. The reconstituted solution in dual chamber bottle remains stable for at least 48 hours upon storage at 25° C./60% RH, and for at least 14 days upon storage at 2-8° C.

In another embodiment, the stable powder for oral solution comprises a blend of cyclophosphamide and mannitol, wherein the ratio of mannitol:cyclophosphamide is not more than about 1.2:1, and optionally consisting of sweetener, flavouring agent and/or preservative, wherein the said powder is not obtained by lyophilization. Mannitol can function as a stabilizer for Cyclophosphamide in the said stable powder for oral solution. Also, mannitol can act as a sweetener for the said oral composition of the present invention. In a preferred embodiment, the ratio of mannitol:cyclophosphamide is about 1:1.

In another embodiment, the present invention relates to an oral composition comprising: (a) a powder blend of cyclophosphamide and mannitol, (b) a diluent, and optionally consisting of sweetener, flavouring agent and/or preservative, wherein the powder can be reconstituted with diluent prior to administration.

In another embodiment, the present invention relates to an oral composition comprising: (a) a powder blend of cyclophosphamide, mannitol and optionally consisting of sweetener, flavouring agent and/or preservative, and (b) a diluent, wherein the powder can be reconstituted with diluent prior to administration.

In another embodiment, the present invention relates to a kit comprising: (a) the powder for oral solution comprising a powder blend of cyclophosphamide and mannitol, and (b) a diluent, wherein the said powder can be reconstituted with the diluent in the said kit prior to administration.

In another embodiment, the present invention relates to a kit comprising: (a) the powder for oral solution comprising a powder blend of cyclophosphamide, mannitol, and optionally consisting of sweetener, flavouring agent and/or preservative, (b) diluent, wherein the said powder can be reconstituted with the diluent in the said kit prior to administration.

In another embodiment, the present invention relates to a kit comprising: (a) the powder for oral solution comprising a powder blend of cyclophosphamide and mannitol, (b) a diluent optionally comprising sweetener, flavouring agent and/or preservative, wherein the said powder can be reconstituted with the diluent in the said kit prior to administration.

In a preferred embodiment, the kit comprises a dual-chamber bottle comprising: (a) the powder blend of cyclophosphamide and mannitol, (b) water, and optionally comprising sweetener, flavouring agent and/or preservative, wherein the said powder can be reconstituted with the water in the said kit prior to administration. The packaging kit of the present invention is designed such that the powder blend in the bottle cap component is released into water compartment of the bottle by applying pressure and tightening of the cap, and hence it can be reconstituted with water in the said bottle prior to administration.

In another embodiment, the present invention relates to a process for preparation of stable powder for oral solution comprising cyclophosphamide and one or more pharmaceutically acceptable excipients.

In another embodiment, the present invention provides a process for the preparation of a stable powder for oral solution comprising the steps of:
  i) Blending of Cyclophosphamide, mannitol, and optionally sweetener, flavouring agent and/or preservative for proper mixing.
  ii) Filling the required quantity of powder blend in a packaging container.

In another embodiment, the present invention relates to a process for preparation of a kit comprising a stable powder for oral solution and a diluent comprising the steps of:
  i) Blending of Cyclophosphamide, mannitol, and optionally sweetener, flavouring agent and/or preservative for proper mixing.
  ii) Filling the required quantity of powder blend and water as a diluent in a kit.

In another embodiment, the present invention relates to a method for treatment of malignant diseases in a paediatric patient comprising of administering an oral composition from a kit comprising: (a) the powder for oral solution comprising a blend of cyclophosphamide and mannitol, (b) diluent, wherein the said powder can be reconstituted with the diluent in the said kit prior to administration.

In one of the preferred embodiment, the present invention provides a stable oral composition comprising Cyclophosphamide and one or more pharmaceutically acceptable excipients, wherein the said composition contains not more than 5% W/W of total impurity of Cyclophosphamide, more preferably does not have more than 3.5% of total impurity of Cyclophosphamide, and most preferably does not have more than 2% of total impurity of Cyclophosphamide, when stored at specific storage conditions.

In one of the preferred embodiments, the present invention provides a stable oral composition comprising Cyclophosphamide and one or more pharmaceutically acceptable excipients, wherein the said composition does not have more than 0.2% W/W of unknown impurity of Cyclophosphamide. In another embodiment, said composition does not have more than 0.1% W/W of unknown impurity of Cyclophosphamide when stored at specific storage conditions.

In order to further illustrate the present invention, the following examples are provided for the purpose of clarity of understanding. However, it is not intended in any way to limit the scope of present invention and it is readily apparent to those of ordinary skill in the art in light of the teachings of this invention that certain changes and modifications may be made thereto without departing from the scope of the invention.

Example 1: Cyclophosphamide Powder for Oral Solution

| Strengths | 150 mg/15 ml | 600 mg/20 ml |
| --- | --- | --- |
| Ingredients | | |
| Cyclophosphamide | 150.0 | 600.0 |
| Mannitol (Pearlitol SD 100) | 146.4 | 585.6 |
| Sucralose | 3.0 | 12.0 |
| Flavour (forest berry) | 0.6 | 2.4 |
| Total Blend | 300.0 | 1200.0 |
| Suspending Vehicle | | |
| Purified Water | q.s. to 15 ml | q.s. to 20 ml |
| Packaging component | | |
| Dual Chamber bottle | 1 No. | 1 No. |
| Powder filling Kit | 1 No. | 1 No. |

Manufacturing Process:

Step-1: Blending of Cyclophosphamide, Mannitol (Pearlitol SD100), Sucralose and Flavor (forest berry) for proper mixing.

Step-2: Taking purified water in a container.

Step-3: Filling the required quantity of blend and purified water in dual chamber bottles using powder filling machine, and a continuous motion liquid filling line with capper.

Example 2: Cyclophosphamide Powder for Oral Solution

| Strengths | 150 mg/15 ml | 600 mg/20 ml |
| --- | --- | --- |
| Ingredients | | |
| Cyclophosphamide | 150.0 | 600.0 |
| Mannitol (Pearlitol SD 100) | 146.4 | 585.6 |
| Suspending Vehicle | | |
| Sucralose | 3.0 | 12.0 |
| Flavor (forest berry) | 0.6 | 2.4 |
| Purified Water | q.s. to 15 ml | q.s. to 20 ml |
| Packaging component | | |
| Dual Chamber bottle | 1 No. | 1 No. |
| Powder filling Kit | 1 No. | 1 No. |

Manufacturing Process:

Step-1: Blending of Cyclophosphamide and Mannitol for proper mixing.

Step-2: Taking purified water in a container and dissolving Sucralose and flavour (forest berry) in purified water by stirring.

Step-3: Filling the required quantity of blend and suspending vehicle in dual chamber bottles using powder filling machine, and a continuous motion liquid filling line with capper.

Example 3: Stability Data for Cyclophosphamide Powder for Oral Solution

Storage Condition: 25° C./60% RH

| Stability Stations | Any individual specified Impurity | Unknown Impurity | Total Impurity |
| --- | --- | --- | --- |
| Initial | 0.022 | ND | 0.022 |
| 3-Months | 0.028 | ND | 0.028 |

The above results indicate enhanced stability of the powder for oral solution as described in Example 2, in terms of lesser impurities, which is within the limit according to the present invention.

Further, the powder blend in the bottle cap component is released into water compartment of the dual chambered bottle by applying pressure and tightening of the cap. The powder is easily reconstituted with water in the said bottle by gentle shaking to obtain an oral composition of Cyclophosphamide.

The obtained oral composition of Cyclophosphamide can be provided to the pediatric patients for the treatment of malignant diseases.

Example 4: Cyclophosphamide Powder for Oral Solution without Preservative

| Strengths | 150 mg/15 ml | 600 mg/20 ml |
| --- | --- | --- |
| Powder Component (mg/Unit) | | |
| Ingredients | | |
| Cyclophosphamide | 150 | 600 |
| Mannitol (Pearlitol SD 100) | 150 | 600 |
| Total Powder Blend Weight | 300 | 1200 |
| Suspending Vehicle (mg/Unit) | | |
| Sucralose | 3 | 12 |
| Flavor (forest berry) | 0.6 | 2.4 |
| Purified Water | q.s. to 15 ml | q.s. to 20 ml |

Manufacturing Process:

Step-1: Blending of Cyclophosphamide and mannitol for proper mixing.

Step-2: Taking purified water (diluent) in a container and dissolving sucralose and flavour (forest berry) in purified water by stirring.

Step-3: Filling the required quantity of blend and suspending vehicle in dual chamber bottles using powder filling machine, and a continuous motion liquid filling line with capper.

Example 5: Stability Data for Cyclophosphamide Powder for Oral Solution

| | Description | | |
|---|---|---|---|
| Conditions | Unknown Impurity NMT 0.2% | Total Impurity NMT 5.0% | Assay 90-110% |
| Initial | ND | 0.016 | 98.8 |
| 40° C./75 RH for 90 days | 0.193 | 1.073 | 98.6 |
| 30° C./65 RH for 90 days | 0.013 | 0.176 | 101.4 |
| 25° C./60 RH for 90 days | 0.005 | 0.055 | 100.5 |

The oral powder for solution according to the present invention remains stable with not more than 5% of total impurity, when stored for at least three months at 40° C./75% RH, 30° C./65% RH and 25° C./60% RH.

Example 6: Cyclophosphamide Powder for Oral Solution with Preservative

| | Unit dose strategy | | Multi-dose strategy | |
|---|---|---|---|---|
| Strengths | 150 mg/ 15 ml | 600 mg/ 20 ml | 150 mg/5 ml; 40 ml | 150 mg/5 ml; 100 ml |
| Powder Component (mg/Unit) Ingredients | | | | |
| Cyclophosphamide | 150 | 600 | 1200 | 3000 |
| Mannitol (Pearlitol SD 100) | 150 | 600 | 1200 | 3000 |
| Suspending Vehicle (mg/Unit) | | | | |
| Sucralose | 3 | 12 | 24 | 60 |
| Flavor (forest berry) | 0.6 | 2.4 | 4.8 | 12 |
| Methyl Paraben | 6.50 | 26.00 | 52 | 130 |
| Propyl Paraben | 0.50 | 2.00 | 4 | 10 |
| Purified Water | q.s. to 15 ml | q.s. to 20 ml | q.s. to 40 ml | q.s. to 100 ml |

The above example is manufactured by the same process as Example-4. The oral compositions of the present invention can be administered as single-dose or multi-dose formulations to adult and paediatric patients.

Example 7: Stability Results for Cyclophosphamide Powder for Oral Solution (150 mg/15 ml) in Dual Chamber Bottle

| | Description | |
|---|---|---|
| Conditions | Unknown Impurity NMT 0.2% | Total Impurity NMT 5.0% |
| 30°/65__180 days | 0.038 | 0.500 |
| 30°/65__180 days (Inverted) | 0.032 | 0.455 |
| 25°/60__180 days | 0.008 | 0.143 |
| 25°/60__180 days (Inverted) | 0.012 | 0.145 |

The oral powder for solution according to the present invention remains stable with not more than 5% of total impurity, when stored in dual chamber bottles for at least six months at 30° C./65% RH and 25° C./60% RH conditions.

Example 8: Stability Results for Cyclophosphamide Powder for Oral Solution (150 mg/15 ml) Upon Reconstitution in Dual Chamber Bottle

| | Description | |
|---|---|---|
| Conditions | Unknown Impurity NMT 0.2% | Total Impurity NMT 5.0% |
| Initial | ND* | 0.032 |
| 25° C./60% RH for 12 hours | ND* | 0.723 |
| 25° C./60% RH for 48 hours | 0.101 | 3.268 |
| 2-8° C. for 7 days | ND | 0.53 |
| 2-8° C. for 14 days | 0.033 | 1.309 |

*ND = Not detected

The reconstituted solution in dual chamber bottle remains stable for at least 48 hours upon storage at 25° C./60% RH, and for at least 14 days upon storage at 2-8° C.

We claim:

1. A stable oral composition of cyclophosphamide comprising: (a) a powder blend of cyclophosphamide and mannitol, and (b) a diluent, wherein the powder comprising cyclophosphamide is not obtained by lyophilization.

2. The stable powder for oral solution according to claim 1, wherein the ratio of mannitol:cyclophosphamide is between 1:1 to 1.2:1, and wherein the oral solution further comprises at least one of a sweetener, flavouring agent and/or preservative.

3. The stable powder for oral solution according to claim 1, wherein the diluent is water, and the powder blend comprising cyclophosphamide can be reconstituted with water prior to administration.

4. The stable powder for oral solution according to claim 1, wherein the amount of cyclophosphamide is from 5 mg/ml to 50 mg/ml.

5. The stable powder for oral solution according to claim 1, wherein the powder comprises not more than 5% of total impurity of Cyclophosphamide, when stored at 40° C./75% RH, 30° C./65% RH and 25° C./60% RH for at least three months.

6. The stable oral composition according to claim 1, wherein the composition in the form of a kit comprising: (a) the powder for oral solution comprising a powder blend of cyclophosphamide, mannitol, (b) a diluent, and at least one of a sweetener, flavouring agent and/or preservative, wherein the powder can be reconstituted with the diluent in the kit prior to administration.

7. A stable powder for oral solution in the form of a kit comprising a dual-chamber bottle comprising (a) a powder blend of cyclophosphamide and mannitol, and (b) a diluent; wherein the powder comprises not more than 5% of total impurity of Cyclophosphamide, when stored at 40° C./75% RH, 30° C./65% RH and 25° C./60% RH for at least three months, and wherein the powder blend is not obtained by lyophilization.

8. The stable oral composition according to claim 1, wherein the composition is administered to a paediatric patient for treatment of malignant diseases comprising: (a) the powder for oral solution comprising a blend of cyclophosphamide, mannitol, and at least one of a sweetener, flavoring agent and/or preservative for proper mixing; and (b) a diluent, wherein the powder can be reconstituted with the diluent prior to administration and wherein the powder is not obtained by lyophilization.

9. The stable powder for oral solution according to claim 1, wherein the cyclophosphamide in the powder blend retains at least 90% of its original label-specified amount when stored at 25° C./60% RH, 30° C./65% RH, or 40° C./75% RH for at least three months.

10. The stable powder for oral solution according to claim 1, wherein the powder blend maintains its free-flowing particulate form and does not undergo visible physical agglomeration during storage at 25° C./60% RH, 30° C./65% RH, or 40° C./75% RH for at least three months.

11. The stable powder for oral solution according to claim 1, wherein the powder blend is prepared without conversion of cyclophosphamide to a hydrated form during manufacture or storage.

12. The stable powder for oral solution according to claim 1, wherein upon reconstitution with the diluent, the resulting oral solution remains stable and free of visible precipitation for at least 24 hours at 25° C./60% RH.

13. The stable powder for oral solution according to claim 1, wherein the powder blend is directly fillable into packaging containers without any milling, granulation, or other particle size modification steps.

* * * * *